(12) United States Patent
Valenciano Mavilio et al.

(10) Patent No.: US 9,864,082 B2
(45) Date of Patent: Jan. 9, 2018

(54) FOURIER FINITE-DIFFERENCE MIGRATION FOR THREE DIMENSIONAL TILTED TRANSVERSE ISOTROPIC MEDIA

(75) Inventors: Alejandro Antonio Valenciano Mavilio, Austin, TX (US); Nizar Chemingui, Houston, TX (US); Sverre Brandsberg-Dahl, Houston, TX (US)

(73) Assignee: PGS Geophysical AS, Oslo (NO)

( * ) Notice: Subject to any disclaimer, the term of this patent is extended or adjusted under 35 U.S.C. 154(b) by 1327 days.

(21) Appl. No.: 12/383,622

(22) Filed: Mar. 27, 2009

(65) Prior Publication Data
US 2010/0110832 A1     May 6, 2010

Related U.S. Application Data

(60) Provisional application No. 61/198,516, filed on Nov. 6, 2008.

(51) Int. Cl.
*G01V 1/28* (2006.01)
(52) U.S. Cl.
CPC ............ *G01V 1/28* (2013.01); *G01V 2210/51* (2013.01); *G01V 2210/626* (2013.01)
(58) Field of Classification Search
CPC . G01V 1/28; G01V 2210/51; G01V 2210/626
USPC .............. 367/32, 38, 52, 53; 702/11, 14, 18; 703/5
See application file for complete search history.

(56) References Cited

U.S. PATENT DOCUMENTS

| 6,785,612 B1 | 8/2004 | Zhang | |
| 8,194,498 B2* | 6/2012 | Du .......................... | G01V 1/282 367/73 |
| 2006/0120217 A1* | 6/2006 | Wu et al. ......................... | 367/32 |

OTHER PUBLICATIONS

Shan et al., "Wavefield extrapolation in laterally-varying tilted TI media," Stanford Exploration Project, Report 117, Oct. 23, 2004, pp. 1-10.*
Press et al., Numerical Recipes, Cambridge University Press, 2002, p. 120.*
Tariq Alkhalifah; (2003); "An acoustic wave equation for orthorhombic anisotropy"; Geophysics, vol. 68, No. 4; pp. 1169-1172.
Tariq Alkhalifah; (2000); "An acoustic wave equation for anisotropic media"; Geophysics, vol. 65, No. 4; pp. 1239-1250.
F. Audebert, V. Dirks, A. Pettenati; (2006); "TTI Anisotropic Depth Migration: What tilt estimate should we use?"; SEG/New Orleans 2006 Annual Meeting; pp. 2382-2386.
Leon Thomsen; (1986); "Weak elastic anisotropy"; Geophysics, vol. 51, No. 10, pp. 1954-1966.

(Continued)

*Primary Examiner* — Daniel L Murphy

(57) ABSTRACT

A method for migrating three dimensional seismic data in tilted transversely isotropic media ("TTI") is based on generating numerical solutions to an exact relationship for a three dimensional dispersion relationship of seismic energy traveling through TTI media. The numerical solutions use selected input values of polar angle and azimuth angle of a transverse isotropic axis of symmetry, and selected values of Thomsen anisotropic parameters to generate tables of numerical values. Based on the tables of numerical values, optimized coefficients for a finite-difference relationship are estimated along multiple splitting directions. The seismic data are then migrated using a three dimensional Fourier finite difference extrapolation algorithm.

15 Claims, 6 Drawing Sheets

(56) References Cited

OTHER PUBLICATIONS

Don C. Lawton, J. Helen Isaac, Robert W. Vestrum, Jennifer M. Leslie; (2001); "Slip-slidin' away—some practical implications of seismic velocity anisotropy on depth imaging"; The Leading Edge; pp. 70-73.

Yan Lanlan, Larry R. Lines, Don C. Lawton; (2004); "Influence of seismic anisotropy on prestack depth migration"; The Leading Edge; pp. 30-36.

Xiang Du, John C. Brancroft, Larry R. Lines; (2005); "Reverse-time migration for tilted TI media"; SEG/Houston 2005 Annual Meeting; pp. 1930-1933.

Richard A. Bale, Samuel H. Gray, M. Graziella Kirtland Grech; (2007); "TTI wave-equation migration"; SEG/San Antonio 2007 Annual Meeting; pp. 2295-2299.

Jon F. Claerbout; (1985); "Imaging the Earth's Interior"; Blackwell Scientific Publications; Chapter 4, pp. 230-305.

Guojian Shan; (2007); "Optimized implicit finite-difference migration for TTI media"; SEG/San Antonio 2007 Annual Meeting; pp. 2290-2294.

Du Xiang, John C. Bancroft, Don C. Lawton, Larry R. Lines; (2006); "Evaluations of prestack anisotropic Kirchhoff, phase-shift-plus-interpolation and reverse-time depth migration methods for dipping TI media"; SEG/New Orleans 2006 Annual Meeting; pp. 179-183.

Guojian Shan, Biondo Biondi; (2005); "3D wavefield extrapolation in laterally-varying tilted TI media"; pp. 104-107.

Dietrich Ristow, Thomas Rühl; (1997); "3-D implicit finite-difference migration by multiway splitting"; Geophysics, vol. 62, No. 2; pp. 554-567.

Guojian Shan, Biondo Biondi, (2008), "Plane-wave migration in titled coordinates", Geophysics, vol. 73, No. 5, pp. S185-S194.

Dhananjay Kumar, Mrinal K. Sen, Robet J. Ferguson, (2004), "Traveltime calculation and prestack depth migration in titled transversely isotropic media", Geophysics, vol. 69, No. 1, pp. 37-44.

Hongbo Zhou, Guanquan Zhang, Robert Bloor, (2006), "An anisotropic acoustic wave equation for modeling and migration in 2D TTI media", SEG Expanded Abstracts, pp. 194-198.

European Search Report, dated Mar. 1, 2010.

\* cited by examiner

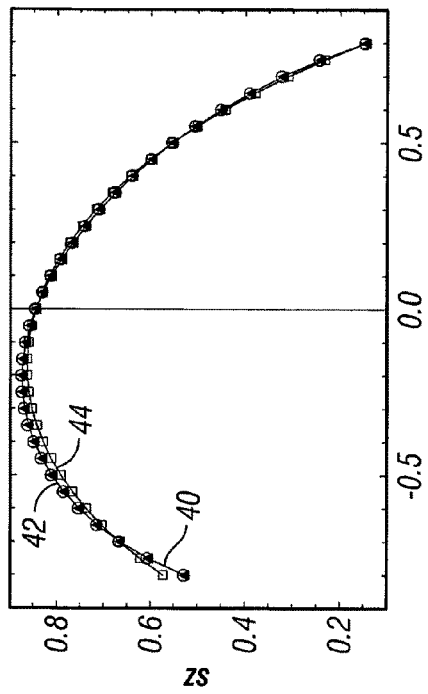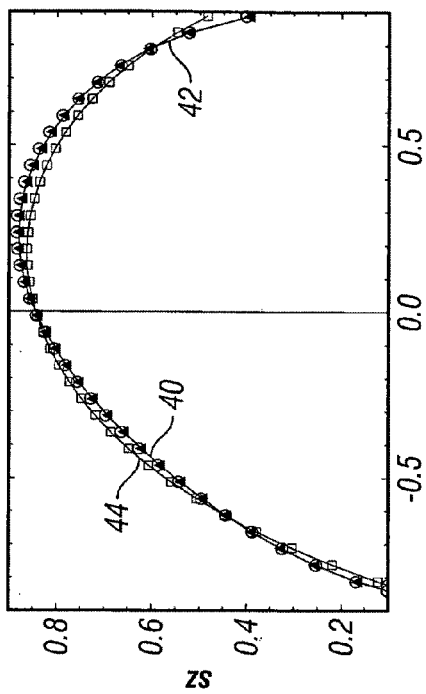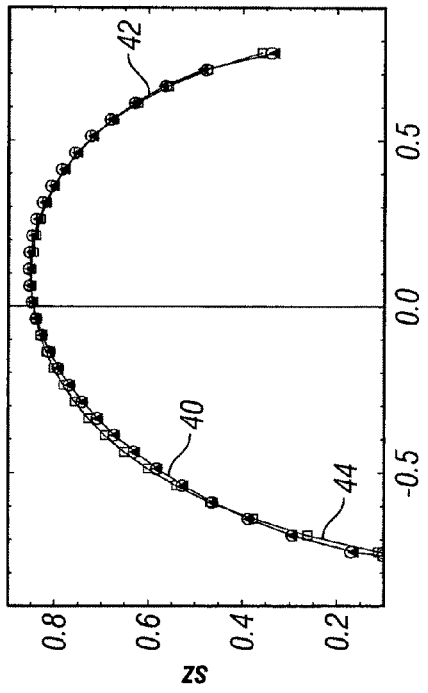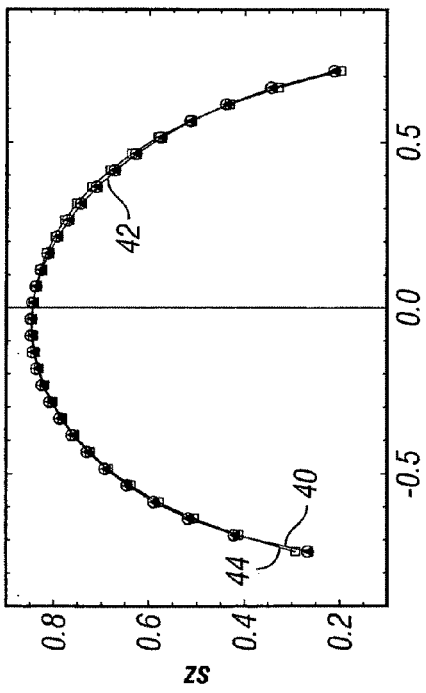

FOURIER FINITE-DIFFERENCE MIGRATION FOR THREE DIMENSIONAL TILTED TRANSVERSE ISOTROPIC MEDIA

CROSS-REFERENCE TO RELATED APPLICATIONS

Priority is claimed from U.S. Provisional Application No. 61/198,516 filed on Nov. 6, 2008.

STATEMENT REGARDING FEDERALLY SPONSORED RESEARCH OR DEVELOPMENT

Not applicable.

BACKGROUND OF THE INVENTION

Field of the Invention

The invention relates generally to the field of seismic data migration processing. More particularly, the invention relates to methods for migrating seismic data that can accurately approximate energy propagation in transversely isotropic media wherein the axis of symmetry is inclined with respect to a measurement surface that holds an array of seismic sensors.

Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the earth's surface, and deploying a seismic energy source near the sensors also at or near the surface. The seismic energy source is actuated and seismic energy emanates from the source, traveling generally downwardly through the subsurface until it reaches one or more acoustic impedance boundaries. Seismic energy is reflected from the one or more impedance boundaries, where it then travels upwardly until being detected by one or more of the sensors. Structure and composition of the subsurface is inferred from the travel time of the seismic energy, and the amplitude and phase of the various frequency components of the seismic energy with respect to the energy emanating from the seismic source.

In order to infer the structures of subsurface earth formations from seismic travel times measured at the earth's surface from a source position at the surface, it is necessary to determine the velocity of the various formations through which the seismic energy passes. Velocities of the earth formations can vary both with respect to depth in the earth (vertically), and with respect to geographic position (laterally). Seismic data, however, are recorded only with respect to time. Methods known in the art for estimating velocities of the earth formations, both vertically and laterally, rely on inferences about the travel path geometry of the seismic energy as it travels from the seismic source to the various seismic receivers deployed at the earth's surface.

Migration is a process performed on seismic data in which depth estimates to one or more reflective horizons (acoustic impedance boundaries) in the earth are made from the "two way" travel time of seismic energy from the source, to the reflective horizons, and back to the seismic receivers. The depth estimates are computed and displayed with respect to geographic position of the reflective horizons. Depth estimates based on two way travel time must be corrected for the effects of seismic energy travel path differences between various seismic energy source and receiver geographic positions that are used during data acquisition. In order to correct the depth estimates for source and receiver positions, it is necessary to accurately account for the velocity of seismic energy in the earth from the earth's surface to (or the ocean bottom in marine seismic data) to each subsurface reflective horizon.

It is known in the art that some earth formations are anisotropic with respect to seismic velocity. Anisotropy can be observed as different velocity in a single medium depending on the direction of propagation of the seismic energy through the medium. In anisotropic earth formations, the depth estimating (imaging) process needs to take the anisotropy into account in order to accurately position the seismic reflective horizons with respect to depth and geographic position. In transversely isotropic media, many of which are structurally laminated, seismic waves can propagate at higher velocity in the direction of the formation layer planes (laminations) than perpendicular to the laminations. If the laminations are oriented substantially horizontally, vertical transverse isotropic ("VTI") migration techniques can be used. If the formation layers are inclined ("dipping") with respect to the Earth's surface, as in subsurface structures including anticlines and thrust belts, however, a tilted transversely isotropic ("TTI") migration technique is more appropriate. See, for example, Lawton, D. C., Isaac, J. H., Vestrum, R. W., and Leslie, J. M., (2001), "Slip-slidin' away—some practical implications of seismic velocity anisotropy on depth imaging", The Leading Edge, 1, pp. 70-73. See also, Yan, L., Lines, L. R., and Lawton, D. C., (2004), "Influence of seismic anisotropy on prestack depth migration", The Leading Edge, 1, pp. 30-36

TTI migration has typically been performed using Kirchhoff methods, because the complexity of the subsurface formations can be handled by using anisotropic ray tracing in travel-time table calculation. More recently, two-way wave equation methods (reverse time migration or "RTM") have been developed. See, for example, Du, X., Bancroft, J. C., and Lines, L R., (2005), "Reverse-time migration for tilted TI media", SEG Expanded Abstracts 24, 1930 and Du, X., Bancroft, J. C., Lawton D. C., and Lines, L. R., (2006), "Evaluations of prestack anisotropic Kirchhoff, phase-shift-plus-interpolation and reverse-time depth migration methods for dipping TI media", SEG Expanded Abstracts 25, 179. However, two-way wave equation methods such that those described in the foregoing publications have proven too computationally expensive to be widely used commercially.

In methods for seismic migration known as "explicit finite-difference" and phase-shift plus interpolation ("PSPI"), the complexity of the algorithms do not significantly increase when operating on a TTI medium (Ferguson and Margrave, 1998). However, in practice, their computational cost increases because in a three dimensional TTI medium the first requires two dimensional convolution with relatively large convolution filters, and the second requires extrapolating many reference wavefields, even if simplifying assumptions about the medium are made. See, Bale, R. A., Gray S. H., and Graziella M., "TTI wave-equation migration", SEG Expanded Abstracts 26, 2295 (2007).

A more computationally economical alternative is an "implicit finite-difference" method. See, Claerbout, J., 1985, "Imaging the earth interior", Blackwell Scientific Publications (1985). The Clarebout method has been used to approximate the TTI dispersion relation. See, Shan, G., "Optimized implicit finite-difference migration for TTI media", SEG Expanded Abstracts 26, 2290 (2007). The approximation described in the Shan publication consists of a combination of odd and even rational function series. Finite-differences coefficients for the rational function series can be estimated by least-squares optimization. Implementations of TTI migration using techniques such as described in the Shan publication do not significantly increase the computational cost as contrasted with migration in isotropic or VTI media. The foregoing observation led to the conclusion that it is possible to implement a Fourier finite difference migration technique that is not excessively computationally expensive.

SUMMARY OF THE INVENTION

A method for migrating three dimensional seismic data in tilted transversely isotropic media ("TTI") includes generating numerical solutions to an exact relationship for a three dimensional dispersion relationship of seismic energy traveling through TTI media. The numerical solutions include selected input values of polar angle and azimuth angle of a transverse isotropic axis of symmetry and selected values of Thomsen anisotropic parameters, the exact relationship defining wavenumbers for seismic data in three dimensions. Coefficients of a two dimensional Fourier finite difference relationship are determined in different splitting directions that result in a best fit to the exact solution of the three dimensional dispersion relationship. Seismic data are migrated using the determined coefficients by using a Fourier finite difference migration scheme.

A computer program according to another aspect of the invention is stored in a computer readable medium. The program includes logic operable to cause a programmable computer to perform steps including the following. Numerical solutions are generated for an exact relationship for a three dimensional dispersion relationship of seismic energy traveling through TTI media. The numerical solutions include selected input values of polar angle and azimuth angle of a transverse isotropic axis of symmetry and selected values of Thomsen anisotropic parameters, the exact relationship defining wavenumbers for seismic data in three dimensions. Coefficients of a two dimensional Fourier finite difference relationship are determined in different directions that result in a best fit to the exact solution of the three dimensional dispersion relationship. Seismic data are migrated using the determined coefficients in Fourier finite difference migration scheme.

Other aspects and advantages of the invention will be apparent from the following description and the appended claims.

BRIEF DESCRIPTION OF THE DRAWINGS

FIGS. 4A through 4D show graphs comparing an exact solution to the dispersion relationship for TTI media to second order and fourth order Fourier finite difference approximations according to the invention.

DETAILED DESCRIPTION

Figure 1:
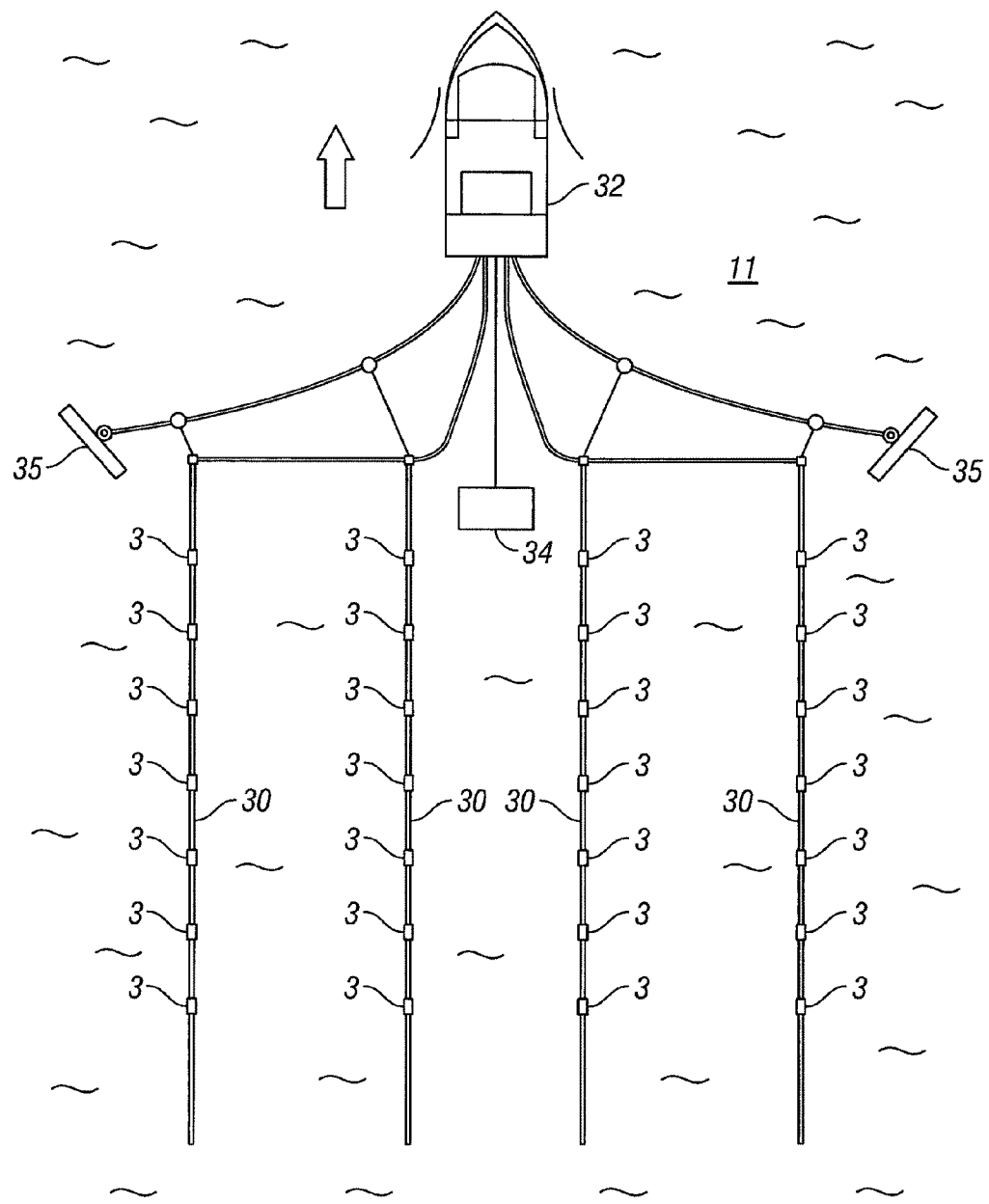
FIG. 1 shows an example of seismic data acquisition for use with a migration method according to the invention.

FIG. 1 shows an example of a marine seismic survey system in which a plurality of streamer cables 30 are towed behind a seismic survey vessel 32 moving on the surface of a body of water 11 such as a lake or the ocean. One or more seismic energy sources 34 also typically towed behind the seismic vessel 32, or by another vessel. The seismic source 34, which typically is an air gun or array of air guns, but may also be a water gun or other type of seismic source known in the art, is actuated at selected times so as to impart seismic energy into the formations below the bottom of the water 11. The seismic energy is reflected by reflectors in the subsurface (below the water bottom) and is eventually detected by seismic sensors 3 disposed at longitudinally spaced apart positions in the streamers 30. Typically a record of signals detected by each of the sensors 3 is made, indexed with respect to the actuation time of the seismic source 34. Such recording may be made by a suitable recording device (not shown) on the seismic survey vessel 32.

Paravanes 35 are used to maintain the streamer cables 30 in the desired lateral position with respect to the centerline of the vessel 32. The invention may also be implemented, however, using seismic cables that are maintained at a substantially stationary position in a body of water, either floating at a selected depth or lying on the bottom of the body of water, in which case the seismic source 34 may be towed behind a different vessel to generate seismic energy pulses at varying locations. The seismic energy source 34 may also be maintained in a fixed position. Further, the example arrangement shown in FIG. 1 including four streamer cables 30, paravanes 35 and the source 34 all towed by the same vessel 32 is not a limit on the scope of the present invention. It is also to be clearly understood that the marine acquisition system example shown in FIG. 1 is not a limitation on the use of seismic data acquired using marine systems. It is within the scope of the present invention to acquire seismic data on the land surface for use with a migration method according to the invention.

Depth migration, as explained in the Background section herein, is a process performed on seismic data in which depth estimates to one or more reflective horizons (acoustic impedance boundaries) in the subsurface are made from the travel time of seismic energy from the source 34, to the reflective horizons, and back to the seismic sensors 3. "Phase shift" migration uses a three dimensional dispersion relation of the scalar wave equation in order to perform seismic wavefield downward extrapolation. The presently described migration method is an example of phase shift migration.

The three dimensional dispersion relation for a tilted transversely isotropic ("TTI") medium, assuming zero shear wave velocity (as explained in Alkhalifah, T., "Acoustic approximations for processing in transversely isotropic media" Geophysics, 63, 623-631 (1998)), can be represented by a fourth order polynomial equation. One such equation is described in Shan, G., and Biondi, B. L., 3D "Wavefield extrapolation in laterally-varying tilted TI media", 75th Annual International Meeting, SEG, Expanded Abstracts, 104-107 (2005) and is show below:

$$a_4 s_z^4 + a_3(s_x,s_y)s_z^3 + a_2(s_x,s_y)s_z^2 a_1(s_x,s_y)s_z + a_0(s_x,s_y) = 0 \quad (1)$$

In the foregoing equation, $s_z=k_z v_{p0}/\overline{\omega}$ s the normalized vertical (z) wave number, $s_x=k_x v_{p0}/\overline{\omega}$ and $s_y=k_y v_{p0}/\overline{\omega}$ are the normalized horizontal (x, y) wave numbers, where k represents wavenumber in the respective domain $v_{p0}$ represents compressional velocity in the symmetry axis direction (P wave) and $\overline{\omega}$ represents the angular frequency. The polynomial coefficients $a_1$ through $a_4$ can be determined by the following expressions:

$$a_0 = 1 - (1 + 2\varepsilon)(s_y\cos\psi + s_x\sin\psi)^2 - \qquad (2)$$
$$(1 + 2\varepsilon)\cos^2\theta(s_x\cos\psi - s_y\sin\psi)^2 - \sin^2\theta(s_x\cos\psi - s_y\sin\psi)^2 -$$
$$2(\delta - \varepsilon)\sin^2\theta(s_y\cos\psi + s_x\sin\psi)^2(s_x\cos\psi - s_y\sin\psi)^2 -$$
$$2(\delta - \varepsilon)\cos^2\theta\sin^2\theta(s_x\cos\psi - s_y\sin\psi)^4$$

$$a_1 = 2\cos\theta\sin\theta(s_x\cos\psi - s_y\sin\psi)$$
$$(-2\varepsilon + 2(\delta - \varepsilon)(s_y\cos\psi + s_x\sin\psi)^2 + 2(\delta\varepsilon)\cos^2$$
$$\theta(s_x\cos\psi - s_y\sin\psi)^2 - 2(\delta - \varepsilon)\sin^2\theta(s_x\cos\psi - s_y\sin\psi))$$

$$a_2 = -\cos^2\theta - (1 + 2\varepsilon)\sin^2\theta - 2(\delta - \varepsilon)\cos^2\theta(s_y\cos\psi + s_x\sin\psi)^2 -$$
$$2(\delta - \varepsilon)\cos^4\theta(s_x\cos\psi - s_y\sin\psi)^2 + 8(\delta - \varepsilon)\cos^2\theta\sin^2$$
$$\theta(s_x\cos\psi - s_y\sin\psi)^2 - 2(\delta - \varepsilon)\sin^4\theta(s_x\cos\psi - s_y\sin\psi)^2$$

$$a_3 = -(\delta - \varepsilon)\sin 4\theta(s_x\cos\psi - s_y\sin\psi)$$

$$a_4 = -(\delta - \varepsilon)\cos^2\theta\sin^2\theta$$

Figure 2:
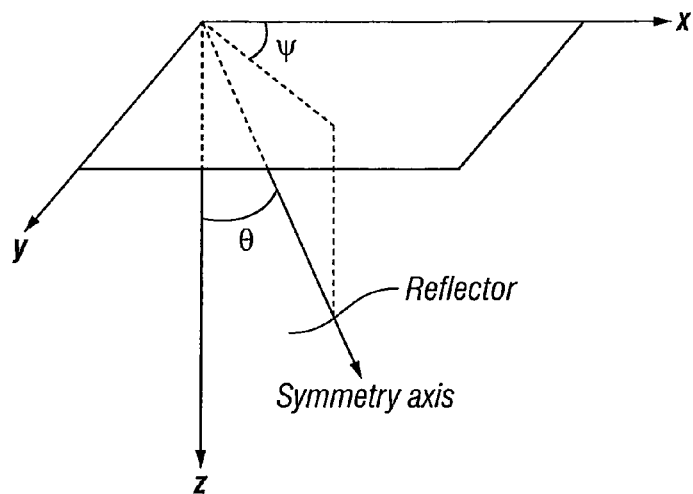
FIG. 2 shows a definition of polar angle and azimuth angle of symmetry axis as used in the present invention.

In the above expressions for determining the polynomial coefficients, $\varepsilon$ and $\delta$ are the Thomsen anisotropic parameters, $\theta$ is the polar angle (angle of inclination of the symmetry axis with respect to a selected reference), and $\psi$ is the azimuth angle of the transverse isotropic symmetry axis. The polar and azimuth angles are shown in FIG. 2 as to how they relate to the coordinate system of seismic imaging. Generally, the coordinate system includes the x axis as horizontal and along the direction of the streamer cables (30 in FIG. 1), the y axis as horizontal and transverse to the streamer cables, and the z axis as vertical. The Thomsen anisotropic parameters are explained, for example, in U.S. Pat. No. 6,785,612 issued to Zhang and assigned to the assignee of the present invention. See also, Thomsen, L., "Weak elastic anisotropy", Geophysics, October 1986, pp. 1954-1966, vol. 51, No. 10 (1986) for an explanation of the Thomsen parameters.

Figure 3:
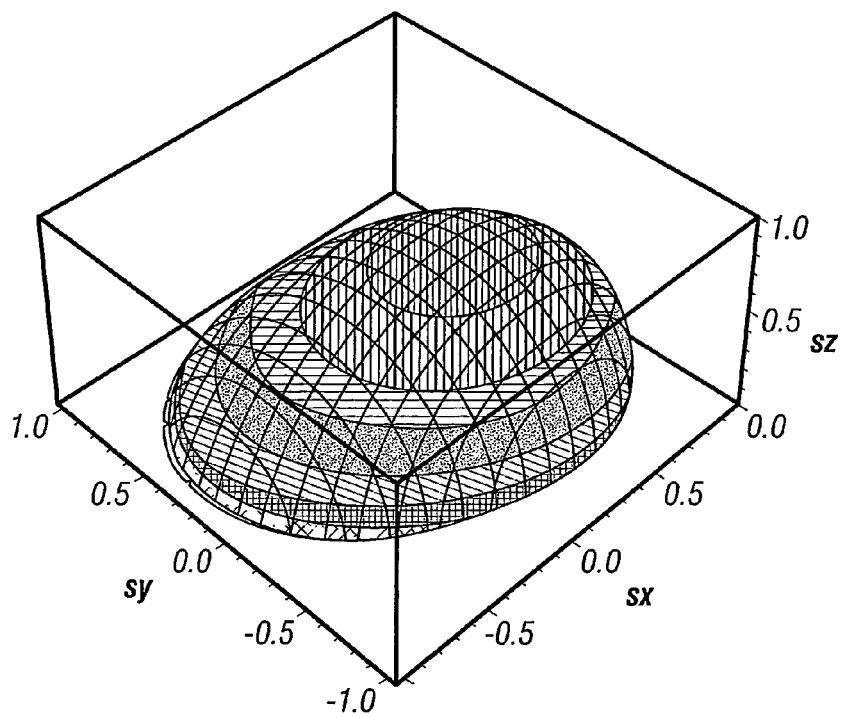
FIG. 3 shows a graphic example of an exact solution to the dispersion relationship in a three dimensional TTI medium.

The fourth order polynomial expression in equation (1) has four solutions, each solution corresponding to one of upgoing compressional (P) waves, downgoing P waves, upgoing shear (S) waves, and downgoing S waves, respectively. The S waves are not part of the method because zero S-wave velocity is assumed for purposes of the present migration technique. In a practical implementation of a method according to the invention, only the root for downward propagating P waves is solved. FIG. 3 shows a graph of a solution to equation (1) corresponding to a downgoing P wave, and values of $\varepsilon=0.4$, $\delta=0.2$, $\theta=60$ degrees, and $\psi=50$ degrees.

Based on a two dimensional implicit finite-difference approximation for the TTI dispersion relation described in, Shan, G., "Optimized implicit finite-difference migration for TTI media", SEG Expanded Abstracts 26, 2290 (2007), a three dimensional Fourier finite-difference ("FFD") migration for TTI media has been developed that consists of three terms: a phase shift term, a thin lens term, and a finite-difference term. The TTI approximation of the present invention uses a combination of odd and even rational function series of selected order n. The TTI dispersion relation approximation, reduced to a 2D relation along any splitting axis, can be expressed as:

$$s_z = m\sqrt{1 - \frac{s_x^2}{m^2}} + s_{z0} - m - \sum_i^n \left(1 - \frac{1}{m}\right)\frac{-c_i s_x + a_i s_x^2 + d_i s_x^3}{1 - b_i\left(1 + \frac{1}{m^2}\right)s_x^2} \qquad (3)$$

The ratio m between the inhomogeneous medium velocity, and a reference medium velocity can be determined by the expression:

$$m = v_{p0}(x,y)/c_{p0m} \qquad (4)$$

The medium velocity $v_{p0}$ is the velocity along the direction of the axis of symmetry of a TTI medium. The accuracy of the FFD approximation at high angles of propagation (high angle with reference to the axis of symmetry) depends on the selected order (n) in equation (3), the value of the coefficients $a_i$, $b_i$, $c_i$ and $d_i$, and the combination of the parameters $\varepsilon$, $\delta$, $\theta$, and $\psi$. Equation (3) was derived under the assumption that the reference medium is isotropic. This assumption is not required for our method, however it simplifies the implementation of the table-based TTI FFD migration.

To create the table, for selected values of m, $\varepsilon$, $\delta$, $\theta$, and $\psi$ within the known ranges of the foregoing parameters, an exact solution to equation (1) is evaluated to numerically compute the corresponding dispersion relation function. The coefficients $a_i$, $b_i$, $c_i$ and $d_i$ that produce a best fit of equation (3) to the numerical dispersion relation are estimated, for example, by using a non-linear least-squares algorithm. The term $s_{z0}$ can be computed analytically, by evaluating equation (1) at $s_x=0$, $s_y=0$. The selected values of the parameters m, $\varepsilon$, $\delta$, $\theta$, and $\psi$ used to generate the table of numerical data can be increments within the known range of values of each of the foregoing parameters, for example, increments of 0.005, 0.01 or 0.02 of the full range of values for each such parameter.

In a three dimensional medium, as shown by the graph in FIG. 3, the dispersion relation is asymmetric not only with respect to the polar angle but also with respect to the azimuth angle. Because of the asymmetry, different optimized coefficients $a_i$, $b_i$, $c_i$ and $d_i$ may be necessary depending on the direction of propagation. In order to reduce numerical anisotropy when using a two-way splitting algorithm, a multi-way splitting approach can be employed. Thus the coefficients $a_i$, $b_i$, $c_i$ and $d_i$ are tabulated for each splitting direction. See, for example, Ristow, D., and T. Ruhl, *3-D implicit finite-difference migration by multiway splitting*, Geophysics, 62, 554 (1997).

FIGS. 4A through 4D show the fit of the approximate (obtained by non-linear least-squares) to the exact dispersion relations in FIG. 3 for splitting directions 0, 45 degrees, 90 degrees, and 135 degrees, respectively. The exact dispersion relation is shown by curves labeled 40 (and indicated by open circles). A second order approximation using equation (3), (after substituting for n=1 and $d_1=0$), is shown by curves labeled 44 (and indicated by open squares). A fourth order approximation (n=2; $d_1=d_2=0$) is shown by curves labeled 42 (and indicated by solid triangles). The fourth order approximation provides less error than the second order approximation. In FIG. 4D curves for the exact solution, second order approximation and fourth order approximation are identified as explained above, and these are the same for each of FIGS. 4A through 4D. Note that in many locations, curves 40, 44 and 42 are superimposed.

Figure 5A:
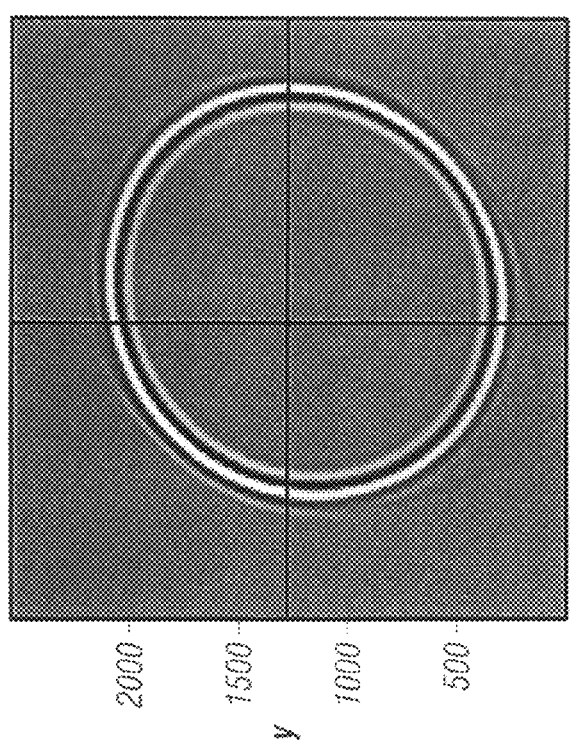
FIGS. 5A, 5B and 5C show calculated impulse responses.
Figure 5C:
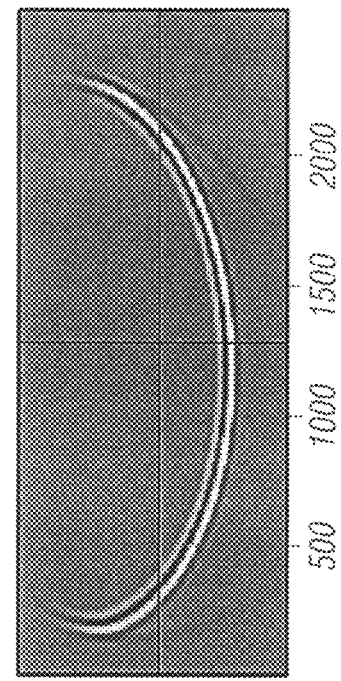
Figure 5B:
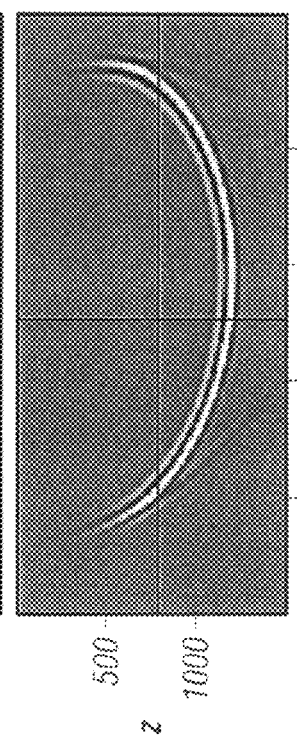

FIG. 5A shows an impulse response calculated for a collocated seismic source and a seismic receiver disposed in the center of the crossed axes. The impulse response of a migration program is its output when the input data is a unit impulse (or a band-limited impulse). As a linear process, migration is completely characterized by its impulse response. The latter describes a definite relationship between input data and output. That is, for any input data, the output image can be calculated in terms of the input and the impulse response. The impulse response test is generally used to diagnose how accurately the migration program would image the subsurface formations. The impulse response is displayed in the horizontal plane (x, y coordinate axes). FIG. 5B shows the same calculated impulse response displayed in the x, z plane. This plane represents the "in-line" direction, which is generally along the length of the seismic sensor streamers (30 in FIG. 1). In FIG. 5B, the source position is at z=0 and x=1250 (along the vertical axis position). FIG. 5C shows the same impulse response displayed in the y, z plane, with the source position at z=0 and along the vertical axis position (y=1250). The plot in FIG. 5C is in the so-called "cross-line" direction, or transverse to the direction of the streamers (30 in FIG. 1).

Figure 6:
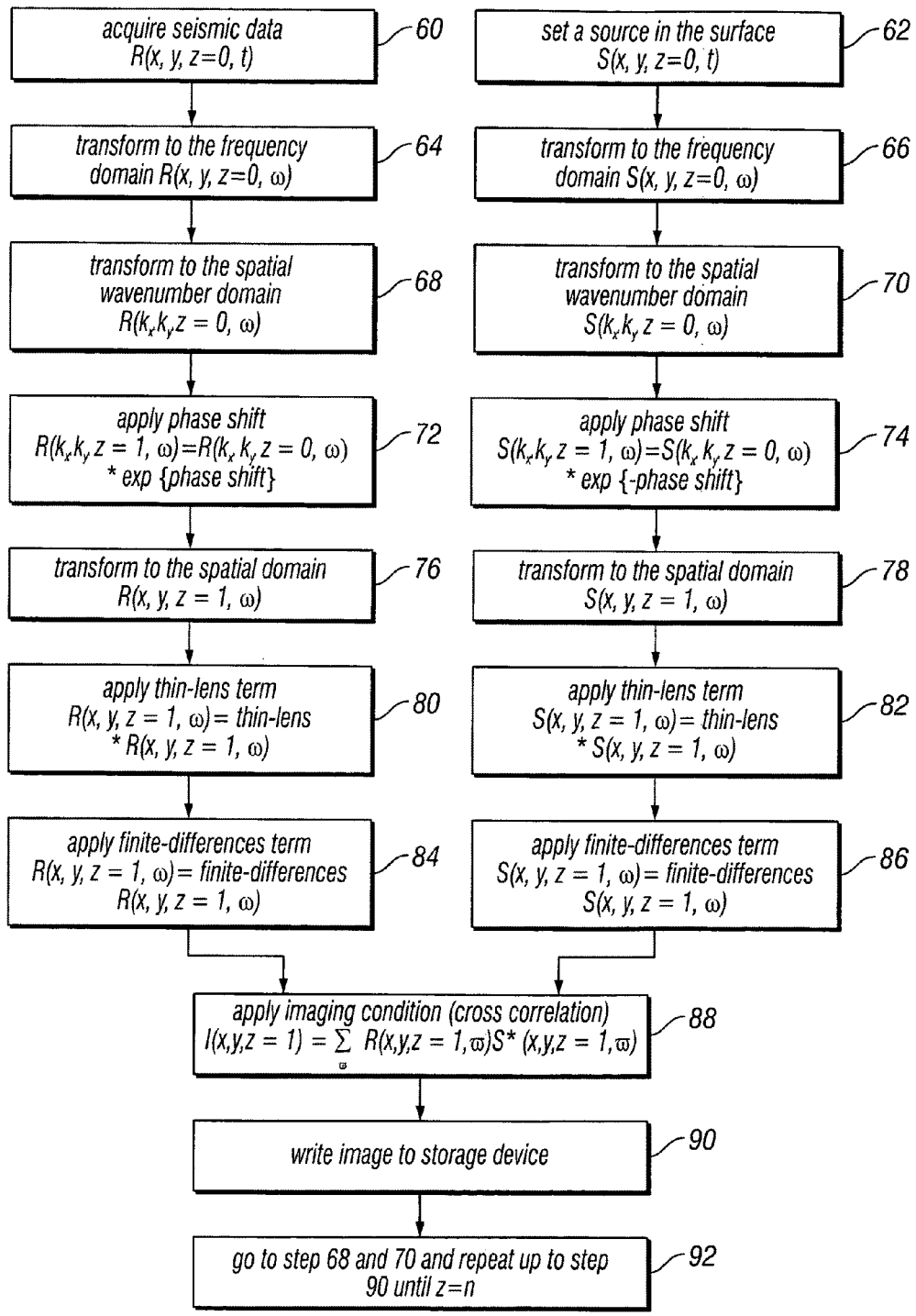
FIG. 6 shows a flow chart of an example implementation of a migration method.

An example implementation of a migration method will be explained with reference to a flow chart in FIG. 6. Seismic data are acquired at 60, for example, using a system such as shown in FIG. 1. The seismic data are recorded in the time domain and are represented by sensor or receiver positions that may be defined in a coordinate plane with respect to a selected reference, for example, the UTM coordinates system. The data in the time domain may be represented, for each receiver, by R(x, y, z=0, t), and referred to as the receiver wavefield at the surface. The receiver wavefield is transformed at 64 into the frequency domain, for example, by using a fast Fourier transform. The transformed receiver wavefield may be represented by R(x, y, z=0, ω). The transformed receiver wavefield is further transformed at 68, such as by fast Fourier transform, to the wavenumber domain to produce R($k_x$, $k_y$, z=0, ω). At 72, the phase shift term (the first part of equation (3) within the square root) is applied to the receiver wavefield in the wavenumber domain to propagate it to a first depth increment from the surface (z=1). The result may be represented by R($k_x$, $k_y$, z=1, ω). At 76 an inverse Fourier transform is applied to the propagated receiver wavefield from the wavenumber domain to the spatial domain (x and y). At 80, the thin lens term of equation (3) is applied to the phase shifted receiver wavefield. The thin lens term is $s_{z0}$−m from equation (3). At 84, the finite difference term (the summation) from equation (3) is applied to the thin lens result.

At 62, a seismic wavefield is initiated from a synthetic seismic energy source disposed at the surface at a source position denominated (x, y, 0). The source signature or wavefield may be, for example, a bandpass filtered impulse (amplitude spike at time=0) or other synthetic source wavelet known in the art used for wave equation migration. The source wavefield is generated in the time domain and may be represented in the time domain by S(x, y, z=0, t). The source wavefield is transformed at 66 to the frequency domain, for example, by using a fast Fourier transform. The transformed source wavefield may be represented by S(x, y, z=0, ω). The transformed source wavefield is further transformed at 70, such as by fast Fourier transform, to the wavenumber domain to produce a wavefield represented by S($k_x$, $k_y$, z=0, ω). At 74, a phase shift is performed on the wavenumber domain transformed source wavefield to propagate it to a first depth increment from the surface represented by (z=1). This phase shift has an opposite sign to the one applied to the receiver wavefield. The result of the propagation may be represented by S($k_x$, $k_y$, z=1, ω). At 78 an inverse Fourier transform is applied to the propagated, transformed source wavefield from the wavenumber domain to the spatial domain (x and y). At 82, a thin lens term is applied to the phase shifted source wavefield. The thin lens term is the quantity ($s_{z0}$−m) from equation (3). At 86, the finite difference term (the summation) from equation (3) is applied to the thin lens result.

The complex conjugate of the source wavefield, propagated to the depth increment z=1 (from 86), is then cross-correlated, at 88, with the propagated receiver wavefield also at the depth increment z=1 (from 84) to obtain an image value at that depth. At 90 the image at depth level z=1 can be saved in memory, or written to a local or external computer storage device. The foregoing procedures are repeated in their entirety, at 92, until a selected depth within the subsurface is reached, that is, z=n, where n represents the maximum depth desired for the image divided by the number of depth increments per unit of depth. The images generated by the foregoing procedure may be stored in a computer readable device or displayed for further processing and/or interpretation.

Figure 7:
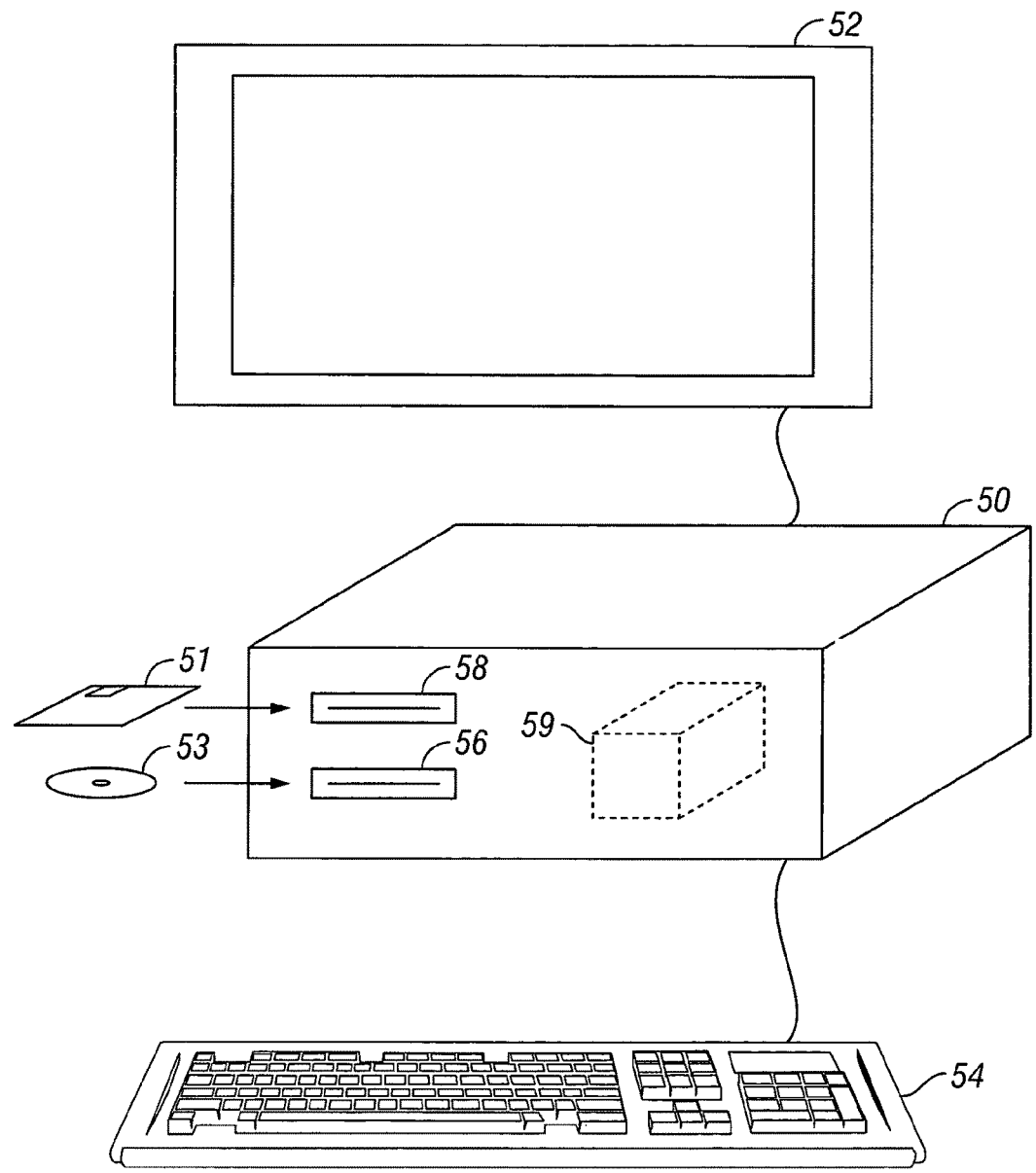
FIG. 7 shows a programmable general-purpose computer with readable storage media and a display.

A method for migrating seismic data according to the invention may be implemented on a programmable computer. Referring to FIG. 7, the foregoing migration method as explained above can be embodied in computer-readable code stored on a computer readable medium, such as floppy disk 51 or a CD-ROM 53 loaded into respective reading or read/write devices 58, 56, or a magnetic hard drive 59 forming part of a general purpose programmable computer. The computer, as known in the art, includes a central processing unit 50, a user input device such as a keyboard 54 and a user display 52 such as a flat panel LCD display or cathode ray tube display. According to this aspect of the invention, the computer readable medium includes logic operable to cause the computer to execute acts as set forth above and explained with reference to FIG. 6.

A method according to the invention may provide a procedure to implement seismic migration in TTI media that is less computationally expensive than methods known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. In a process for generating an image of a subsurface earth formation using marine seismic techniques in which recorded seismic data representing signals acquired by deploying seismic sensors and a seismic energy source, actuating the source and detecting seismic energy reflected from the subsurface in response thereto with the seismic sensors, the reflections from which are captured in the recorded seismic data for use in generating the image, the specific improvement consisting of:
   transforming the recorded seismic data into the wavenumber-frequency domain;
   generating three-dimensional numerical solutions to an exact relationship for a three dimensional dispersion relationship of seismic energy traveling through the subsurface earth formation, the numerical solutions calculated using a pre-computed table including selected input values of polar angle and azimuth angle of a transverse isotropic axis of symmetry and selected values of Thomsen anisotropic parameters and selected values of a ratio of inhomogeneous medium velocity along the transverse isotropic axis of symmetry to a reference medium velocity, the exact relationship defining wavenumbers for the seismic data in three dimensions;

determining coefficients of a two-dimensional Fourier finite difference relationship that result in a best fit of wavenumbers to the three-dimensional numerical solutions for different splitting directions, resulting in a set of coefficients for each splitting direction; and generating an image of the subsurface earth formation by migrating the transformed seismic data using the wavenumbers from the Fourier finite difference relationship and the set of coefficients from each splitting direction, thereby enhancing the image by displaying inclined formation layers of the subsurface earth formation.

2. The process of claim 1 wherein the Fourier finite difference relationship includes a phase shift term, a thin lens term and a finite difference term.

3. The process of claim 1 wherein the determining the sets of coefficients comprises multiple-way splitting.

4. The process of claim 1 wherein the determining sets of coefficients comprises non-linear least squares fitting.

5. The process of claim 1 wherein the migrating the transformed seismic data comprises depth migrating the transformed seismic data.

6. A non-transitory computer readable medium having stored thereon a computer program, the program containing logic operable to cause a programmable computer to perform steps comprising:

transforming three-dimensional recorded seismic data into the wavenumber-frequency domain, the recorded seismic data representing signals acquired by deploying seismic sensors and a seismic energy source, actuating the source and detecting seismic energy reflected from a subsurface earth formation in response thereto using seismic sensors;

generating three dimensional numerical solutions to an exact relationship for a three dimensional dispersion relationship of seismic energy traveling through the subsurface earth formation, the numerical solutions calculated using a pre-computed table including selected input values of polar angle and azimuth angle of a transverse isotropic axis of symmetry and selected values of Thomsen anisotropic parameters and selected values of a ratio of inhomogeneous medium velocity along the transverse isotropic axis of symmetry to a reference medium velocity, the exact relationship defining wavenumbers for the seismic data in three dimensions;

determining coefficients of a two-dimensional Fourier finite difference relationship that result in a best fit of wavenumbers to the three-dimensional numerical solutions for different splitting directions, resulting in a set of coefficients for each splitting direction; and generating an image of the subsurface earth formation by migrating the transformed seismic data using the wavenumbers from the Fourier finite difference relationship and the set of coefficients from each splitting direction, thereby enhancing the image by displaying inclined formation layers of the subsurface earth formation.

7. The computer readable medium of claim 6 wherein the Fourier finite difference relationship includes a phase shift term, a thin lens term and a finite difference term.

8. The computer readable medium of claim 6 wherein the determining the sets of coefficients comprises multiple-way splitting.

9. The computer readable medium of claim 6 wherein the determining coefficients comprises non-linear least squares fitting.

10. The computer readable medium of claim 6 wherein the migrating the transformed seismic data comprises depth migrating the transformed seismic data.

11. A system to generate an image of a subsurface earth formation, the system comprising:

a processing unit;

a computer readable medium; and computer-readable code stored in the computer readable medium that when executed using the processing unit controls the system to carry out transforming three-dimensional recorded seismic data into the wavenumber-frequency domain, the recorded seismic data representing signals acquired by deploying seismic sensors and a seismic energy source, actuating the source and detecting seismic energy reflected from a subsurface earth formation in response thereto using seismic sensors;

generating three dimensional numerical solutions to an exact relationship for a three dimensional dispersion relationship of seismic energy traveling through the subsurface earth formation, the numerical solutions calculated using a pre-computed table including selected input values of polar angle and azimuth angle of a transverse isotropic axis of symmetry and selected values of Thomsen anisotropic parameters and selected values of a ratio of inhomogeneous medium velocity along the transverse isotropic axis of symmetry to a reference medium velocity, the exact relationship defining wavenumbers for the seismic data in three dimensions;

determining coefficients of a two-dimensional Fourier finite difference relationship that result in a best fit of wavenumbers to the three dimensional numerical solutions for different splitting directions, resulting in a set of coefficients for each splitting direction; and generating an image of the subsurface earth formation by migrating the transformed seismic data using the wavenumbers from the Fourier finite difference relationship and the set of coefficients from each splitting direction, thereby enhancing the image by displaying inclined formation layers of the subsurface earth formation.

12. The system of claim 11 wherein the Fourier finite difference relationship includes a phase shift term, a thin lens term and a finite difference term.

13. The system of claim 11 wherein the determining the sets of coefficients comprises multiple-way splitting.

14. The system of claim 11 wherein the determining coefficients comprises non-linear least squares fitting.

15. The system of claim 11 wherein the migrating the transformed seismic data comprises depth migrating the transformed seismic data.

* * * * *